United States Patent [19]

Grennan

[11] Patent Number: 5,634,340

[45] Date of Patent: Jun. 3, 1997

[54] COMPRESSED GAS ENERGY STORAGE SYSTEM WITH COOLING CAPABILITY

[75] Inventor: Charles W. Grennan, Wellsville, N.Y.

[73] Assignee: Dresser Rand Company, Corning, N.Y.

[21] Appl. No.: 324,516

[22] Filed: Oct. 14, 1994

[51] Int. Cl.⁶ ............................................. F01K 13/02
[52] U.S. Cl. .......................... 60/652; 60/648; 60/650; 60/682
[58] Field of Search .................... 60/652, 648, 650, 60/682, 727

[56] References Cited

U.S. PATENT DOCUMENTS

| | | | |
|---|---|---|---|
| 2,421,387 | 6/1947 | Lysholm | 60/650 |
| 3,630,022 | 12/1971 | Jubb | 60/650 |
| 4,100,745 | 7/1978 | Gyarmathy et al. | 60/652 |
| 4,148,191 | 4/1979 | Frutschi | 60/652 |
| 4,150,547 | 4/1979 | Hobson | 60/659 |
| 4,275,310 | 6/1981 | Summers et al. | 60/652 |
| 4,347,706 | 9/1982 | Drost | 60/659 |
| 4,523,432 | 6/1985 | Frutshci | 60/659 |
| 4,593,202 | 6/1986 | Dickinson | 60/652 |
| 4,677,307 | 6/1987 | Vadas et al. | 60/659 |
| 4,765,142 | 8/1988 | Nakhamkin | 60/652 |
| 4,872,307 | 10/1989 | Nakhamkin | 60/39.02 |
| 4,936,098 | 6/1990 | Nakhamkin | 60/652 |
| 4,995,234 | 2/1991 | Kooy et al. | 60/652 |

Primary Examiner—Denise L. Gromada
Assistant Examiner—Alfred Basichas
Attorney, Agent, or Firm—Nixon, Hargrave, Devans & Doyle

[57] ABSTRACT

One aspect of the present invention relates to a process of cogeneration utilizing a compressed gas energy storage system which includes a gas storage area, a compression train for pressurizing a gas to be stored in the gas storage area, and an expansion train for depressurizing high pressure gas released from the gas storage area. The process includes operating the compression train during off-peak electricity utilization periods to produce a compressed gas. The compressed gas is stored in the gas storage area and later released during peak electricity utilization periods through the expansion train to generate electricity. This reduces the compressed gas pressure and temperature. The gas can then be used for refrigeration by contacting it with a material to be chilled with that gas. One aspect of this invention involves generating electricity and effecting refrigeration by depressurization of natural gas from high pipeline transmission pressures to lower distribution pressures. A procedure for energy recovery is also disclosed.

28 Claims, 2 Drawing Sheets

COMPRESSED GAS ENERGY STORAGE SYSTEM WITH COOLING CAPABILITY

FIELD OF THE INVENTION

The present invention relates to a compressed gas energy storage system with cooling capability.

BACKGROUND OF THE INVENTION

There is significant daily variation in the total amount of power required from a baseload power plant. However, it would be costly and wasteful to provide for peak demands of short duration with more baseload power plant machinery.

In the past, power utilities have addressed the problem of providing additional non-baseload peaking power in an economic manner through the use of simple cycle gas turbines ("SCGTs"). Simple cycle gas turbines are state-of-the-art turbomachinery designed for peaking duty operation. Their main elements are an air compressor, a turbine, and a combustor. To meet consumer demand, SCGTs are coupled to electric generators to provide additional power to baseload power plants during peak loads.

Most recently, power utilities have addressed this problem of supplying peaking power in a cost effective manner by use of Compressed Air Energy Storage ("CAES") systems. CAES plants store off-peak energy from relatively inexpensive energy sources such as coal and nuclear baseload plants by compressing air into storage devices such as underground caverns or reservoirs. Underground storage can be developed in hard rock, bedded salt, salt dome, or aquifer media.

Following off-peak storage, the compressed air is withdrawn from storage, heated with fuel, and expanded through expanders, i.e., turbines, to provide needed peaking or intermediate power. Since inexpensive off-peak energy is used to compress the air, the need for premium fuels, such as natural gas and imported oil, is reduced by as much as about two-thirds compared with conventional gas turbines. Under these circumstances, utilization of non-peak energy for subsequent production of peak energy is clearly desirable, especially since non-peak energy can often be obtained for far less than the cost of obtaining peak energy.

Compressors and turbines in CAES plants are each connected to a synchronous electrical generator/motor device through respective clutches, permitting operation either solely of the compressors or solely of the turbines during appropriate selected time periods.

During off-peak periods (i.e., nights and weekends), the compressor train is driven through its clutch by the generator/motor. In this scheme, the generator/motor functions as a motor, drawing power from a power grid. The compressed air is then cooled and delivered to storage.

During peak/intermediate periods, with the turbine clutch engaged, compressed air is withdrawn from storage and provided to a combustor. In the combustor, the compressed air oxidizes a fuel, and the combustion by-products are charged to a turbine, which generates power by driving the generator/motor. In this scheme, the generator/motor functions as a generator, providing power to a power grid. To improve the CAES heat rate, waste heat from a low pressure turbine exhaust is used to pre-heat high pressure turbine inlet air in a recuperator.

For a more complete discussion of CAES systems, see M. Nakhamkin, et al. "Compressed Air Energy Storage: Plant Integration, Turbomachinery Development," ASME International Gas Turbine Symposium and Exhibition, Beijing, Peoples' Republic of China, 1985 and M. Nakhamkin, et al. "Compressed Air Energy Storage (CAES): Overview, Performance and Cost Data for 25 MW to 220 MW Plants", Joint Power Generation Conference, Toronto, Canada 1984, both of which are hereby incorporated by reference.

Examples of CAES systems are disclosed in U.S. Pat. No. 4,100,745 to Gyarmathy et al., U.S. Pat. No. 4,593,202 to Dickinson, and U.S. Pat. No. 4,872,307 to Nakhamkin. These systems are directed to electrical power storage and generation alone.

In order to maximize the efficiency of a CAES system, it is desirable to preheat gas released from the storage cavern by heat-exchanging contact with that gas after expansion. See U.S. Pat. No. 4,936,098 to Nakhamkin, U.S. Pat. No. 4,150,547 to Hobson, and U.S. Pat. No. 4,523,432 to Frutschi.

Another heat recovery technique involves the use of heat generated during compression to warm gas released from storage.

In U.S. Pat. No. 4,150,547 to Hobson, compressed air entering an air storage cavern first passes through a heat storage cavern to recover and store (in a heat storage medium) heat in the compressed air. When air is released from the storage cavern, it again passes through the heat storage cavern, where it is heated.

In U.S. Pat. No. 4,347,706 to Drost, boiler water used to drive steam turbines for compressing air is heated in the compressor innercoolers and aftercoolers, and excess energy from the boiler is stored in a thermal storage unit. Air released from storage is passed through preheaters prior to expansion where heat is provided by the thermal storage unit.

U.S. Pat. No. 4,523,432 to Frutschi discloses a CAES system where heat is recovered from the compressor innercoolers and is stored in a heat storage device by passing water between the innercooler and that device. Compressed air released from storage passes through an exchanger where it is heated by hot water from the heat storage device.

Despite the continued development of heat recovery systems for CAES systems, the need to improve the thermal efficiency and match the thermal cycle to demand for such systems remains.

SUMMARY OF THE INVENTION

One aspect of the present invention relates to a process of cogeneration utilizing a compressed gas energy storage system which includes a gas storage area, a compression train for pressurizing a gas to be conveyed to the gas storage area, and an expansion train for efficiently depressurizing high pressure gas released from the gas storage area. The process includes operating the compression train during off-peak electricity utilization periods to produce a compressed gas. The compressed gas is stored in the gas storage area and is later released during peak electricity utilization periods. The compressed gas is released from the gas storage area through the expansion train to generate electricity and to reduce the compressed gas pressure and temperature. As a result of such expansion, the previously compressed gas is chilled and contacted with materials requiring refrigeration.

Another embodiment of the present invention relates to a process for electricity generation with a compressed gas energy storage system as described above. This process may be initiated by operating the compression train during off-peak electricity utilization periods to produce a compressed gas. The gas is cooled during operation of the compression train with a cooling fluid. The compressed gas is then stored in a gas storage area. During peak electricity utilization, compressed gas is released from the gas storage area and passed through the expansion train to generate electricity. The compressed gas is heated during release from the gas storage area by passing it through a heat exchanger. The cooling fluid is contacted with the heat exchanger to transfer heat from the cooling fluid to the heat exchanger, thereby reducing the temperature of the cooling fluid, and warming the heat exchanger in order to heat the gas released from storage. The present invention is also directed to a compressed gas energy storage system for carrying out this process.

DETAILED DESCRIPTION OF THE DRAWINGS

Figure 1:
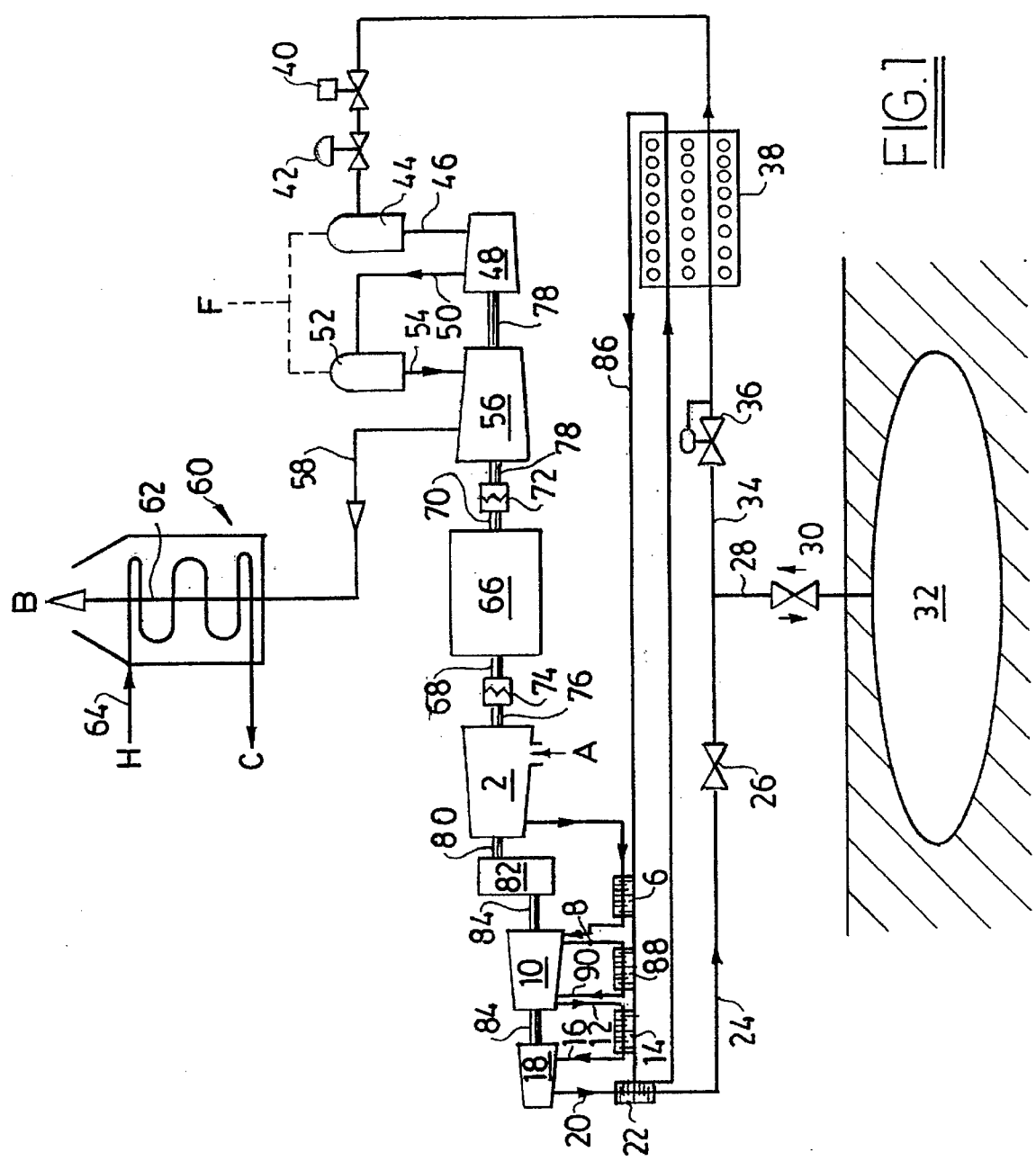
FIG. 1 is a schematic view of a first embodiment of a compressed gas energy storage system in accordance with the present invention.

FIG. 1 is a schematic view of a first embodiment of a compressed gas energy storage system in accordance with the present invention.

During off-peak hours of electricity utilization, available electricity is utilized to compress a gas, preferably air, for storage and subsequent use. During this phase of operation, incoming air A enters low pressure compression section 2 and exits through outlet line 4. The partially compressed air is cooled in low pressure cooler 6 and then enters intermediate pressure compression section 10 through inlet line 8. Such cooling at this and subsequent sections is for the purpose of reducing the gas volume and, as a result, improving compression. Intermediate pressure compression section 10 is intercooled by passing process fluid (e.g., air) via cooling loop 90 through cooler 88 and into heat exchange contact with cooling fluid (e.g., water) passing through cooling line 86. The further compressed air is discharged through outlet line 12, passes through intercooler 14, and enters high pressure compression section 18 through inlet line 16. After high pressure compression, the fully compressed air passes through outlet line 20, aftercooler 22, feed line 24, shut off/check valve 26, cavern feed/discharge line 28, and cavern isolation valve 30.

Each of compression sections 2, 10, and 18 contains a plurality of stages formed by separate rotors. By virtue of the presence of cooler 88 and cooling loop 90, compression section 10 is actually two sections having a plurality of rotors, each forming a separate stage.

During the above-described compression operation, valve 26 and valve 30 are open to permit compressed air to enter gas storage chamber 32, while valve 36 is closed to prevent the compressed air from entering the system's expansion train which is described in more detail below. It may also be possible to effect expansion and compression simultaneously as with a conventional gas turbine mode. This involves leaving the expansion train clutch (discussed infra) engaged. Once the compression stage is completed, valve 30 is closed to retain the compressed air within gas storage chamber 32 at an elevated pressure. Once peak electrical utilization periods are reached, valve 30 and valve 36 are opened to permit air stored within gas storage chamber 32 to enter the expansion train of the system. At this time, the shut off/check valve 26 is closed in order to prevent the compressed air from flowing back to the compressor train.

Compressed air released from gas storage chamber 32 passes through valve 30, cavern feed/discharge line 28, discharge line 34, pressure control valve 36, recuperator 38, air trip valve 40, and air throttle valve 42. Air trip valve 40 and air throttle valve 42 are used to govern the speed of this turbomachinery. The air is further heated in high pressure combustor 44 by utilizing the air as an oxidant for fuel F. The heated combustion by-product gases from high pressure combustor 44 pass through outlet line 46 and into high pressure expansion section 48. Reduced pressure gas exits through outlet 50 and enters low pressure combustor 52 where those gases are further heated by combusting fuel F in this vitiated air stream. Combustion in high pressure combustor 44 and low pressure combustor 52 is carried out to increase the temperature of the fluid subjected to expansion, thereby improving power and efficiency. Combustion by-product gases leave low pressure combustor 52 via line 54 and enter low pressure expansion section 56. Like the above-discussed compression train, each section 48 and 56 of the expansion train has a plurality of stages, each formed by a separate rotor wheel.

After undergoing further pressure reduction in low pressure expansion section 56, the now-chilled gases exit through outlet line 58 and pass through refrigeration unit 60. The cooled gases passing through refrigeration coil 62 are contacted with material to be refrigerated. In FIG. 1, warm material H enters line 64 for cooling and is discharged as cool material C.

Motor/generator 66 is coupled to both the compression train and the expansion train described above. As a result, during off-peak electricity utilization periods, motor/generator 66 drives the compressor train, and, during peak electricity utilization periods, motor/generator 66 is driven by the expansion train in order to generate electricity.

Motor/generator 66 is coupled to the compression train by shaft 68, clutch 74, and shaft 76. Low pressure compression section 2 is coupled to intermediate pressure compression section 10 by means of shaft 80, speed increasing gear 82, and shaft 84. Shaft 84 also connects intermediate pressure compression section 10 and high pressure compression section 18. Note that shafts 76 and 80 can actually be the same shaft and/or may contain flexible couplings. Speed increasing gear 82 is used to optimize compressor efficiency by maintaining the appropriate specific speed. In this arrangement, the compression ratio, which is defined as the ratio of discharge pressure to inlet pressure is approximately 3 to 1 for each compressor section.

Motor/generator 66 is coupled to the expansion train by shaft 70, clutch 72, and shaft 78 which is connected to low pressure expansion section 56. Low pressure expansion section 56 and high pressure expansion section 48 are coupled by shaft 78 or these two units can be flexibly covered. In this arrangement, the expansion ratio, which is defined as the ratio of inlet pressure to discharge pressure is subsonic—i.e. less than 2 to 1 per expansion section.

During operation of the compression train, clutch 72 is disconnected to isolate high pressure expansion section 48 and low pressure expansion section 56 from motor/generator 66. At the same time, clutch 74 is engaged so that operation of motor/generator 66 drives low pressure compression section 2, intermediate pressure compression section 10, and high pressure compression section 18.

In peak periods of electricity utilization, the expansion train is operated by disconnecting clutch 74 so that motor/generator 66 is isolated from the compression train, and clutch 72 is engaged so that the expansion train is coupled to motor/generator 66. As a result, the passage of compressed air through low pressure expansion section 56 and high pressure expansion section 48 drives motor/generator 66 which produces electricity.

As described above, the compression train is provided with a number of heat exchangers to effect cooling. These heat exchangers are in turn cooled by passing a cooling fluid through each of these heat exchangers. Suitable coolants include water, oils, and man-made chemical fluids/refrigerants. In one embodiment, the oil used to lubricate turbomachinery for the above-described expansion and compression train can be cooled by supplying its heat to the expanding gas from the reservoir. In this embodiment, oil is withdrawn from a reservoir (not shown) and passed to the turbomachinery and the heat exhangers via cooling line 86. As a result of contact with the compression train heat exchangers, the cooling fluid is heated and must be cooled. This is achieved with recuperator 38 which utilizes a molten salt or similar materials to transfer heat to the compressed gas discharged from gas storage chamber 32. Such heating of the compressed gas is for the purpose of recovering cycle heat loss and increasing expander inlet temperature to improve power and efficiency. Recuperator 38 also lowers the temperature of cooling fluid to be contacted with the heat exchangers of the compression train. Suitable materials and structures for such heat recuperation devices are disclosed in U.S. Pat. No. 4,347,706 to Drost and U.S. Pat. No. 4,150,457 to Hobson, which are hereby incorporated by reference. Cooling fluid passes between the heat exchangers of the compression train and recuperator 38 via coolant line 86.

In conventional CAES systems, a recuperator can be utilized to preheat air exiting from the reservoir by heat exchange contact with gas leaving the lower pressure expansion section. In the present invention, such heat exchange contact would adversely affect the ability to achieve refrigeration. Accordingly, when retrofitting existing CAES systems to practice the present invention, it is necessary to provide lines with appropriate valving to by-pass the recuperator.

The compressed air energy storage system of FIG. 1 is useful where the gas to be compressed, stored, and expanded is air rather than a more valuable gas which must be maintained at a high level of purity for ultimate use. More particularly, when the air is passed through high pressure combustor 44 and low pressure combustor 52, combustion by-products become mixed with and consume oxygen within the air. As a result, the content of the air is altered from that which it possessed upon first entering the system.

When utilizing air as the gas undergoing compression, storage, and expansion, the compressed gas energy storage system of FIG. 1 operates according to the operating conditions set forth in Table 1.

TABLE 1

| Inlet to Low Pressure Compression Section 2 | |
| --- | --- |
| Pressure | 1 Bar |
| Temperature | 20° C. |
| Exhaust from High Pressure Compression Section 18 | |
| Pressure | 100 Bar |
| Temperature | To 300° C. |

TABLE 1-continued

| Air in Cavern 32 | |
| --- | --- |
| Pressure | 100 Bar |
| Temperature | 40° C. |
| Flow Rate | To 1,000 lb/sec |
| Inlet to High Pressure Combustor 44 | |
| Pressure | To 70 Bar |
| Temperature | 20 to 300° C. |
| Inlet to High Pressure Expander 48 | |
| Pressure | To 70 Bar |
| Temperature | 20 to 600° C. |
| Inlet to Low Pressure Combustor 52 | |
| Pressure | 20 Bar |
| Temperature | To 450° C. |
| Inlet to Low Pressure Expander 56 | |
| Pressure | 20 Bar |
| Temperature | To 1100° C. |
| Exhaust From Low Pressure Expander 56 | |
| Pressure | 1 Bar |
| Temperature | 0 to 450° C. |
| Power Generation by Motor/Generator 66 | To 330 MW |

Figure 2:
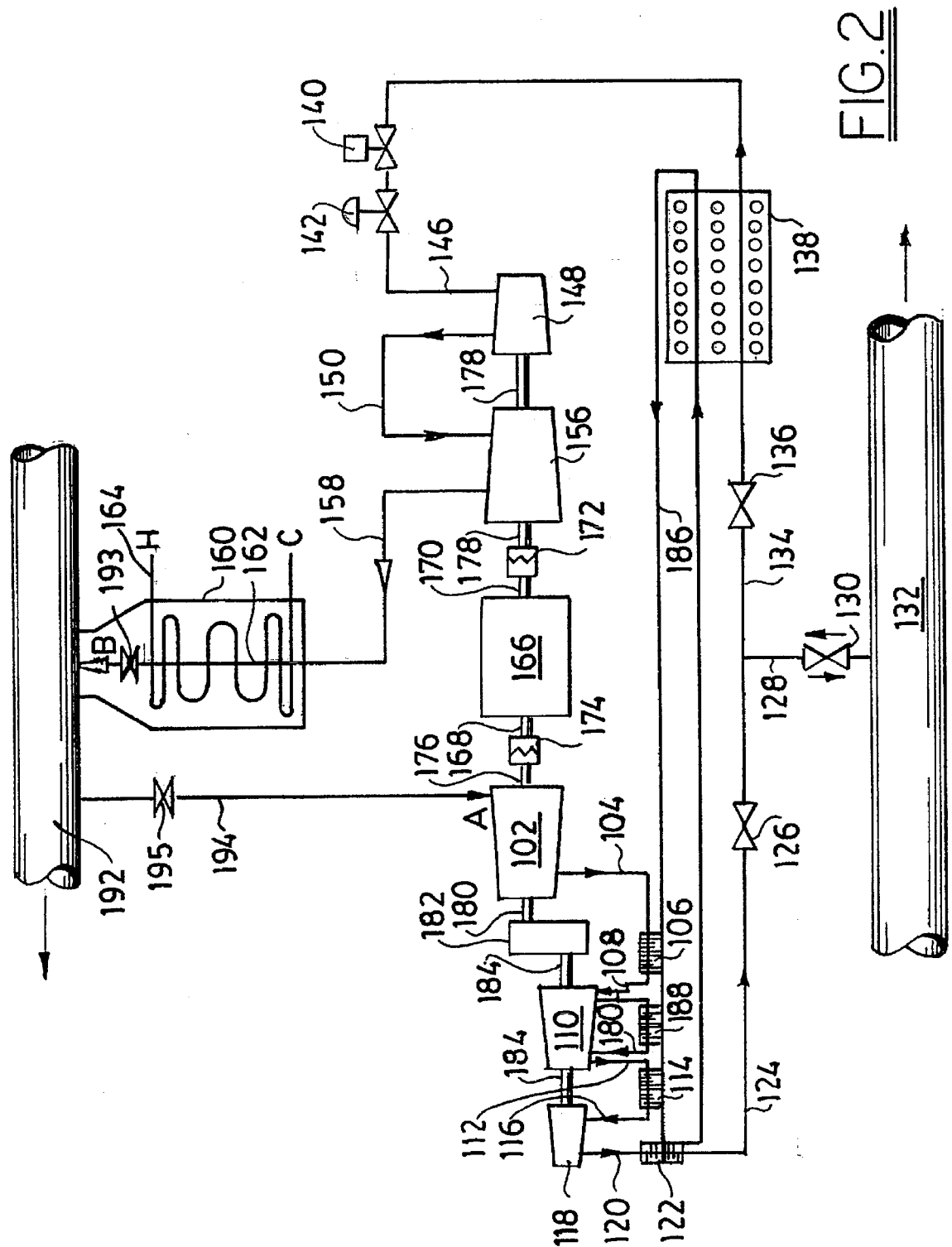
FIG. 2 is a schematic view of a second embodiment of a compressed gas energy storage system in accordance with the present invention.

FIG. 2 is a schematic view of a second embodiment of a compressed gas energy storage system in accordance with the present invention. In large part, the component parts of the systems of FIGS. 1 and 2 are the same. Each have similar numbering systems except that the component parts of FIG. 2 have designation numbers which are 100 greater than the number of the corresponding part in FIG. 1.

The embodiment of FIG. 2 is particularly useful for product gases, generally of relatively high purity, which have been transported long distances at high pressure through transmission pipelines. When such gases reach their region of use, they are withdrawn from the transmission line, depressurized, and carried at such lower pressures to end users in distribution pipelines. One example of a gas transported in this fashion is natural gas. The embodiment of FIG. 2 is directed to integrating a CAES system with a product gas transport network. During off-peak electricity utilization periods, gas in lower pressure distribution lines is compressed and passed into the transmission lines. When peak electrical use periods are encountered, gas in the transmission lines is expanded and passed into the distribution lines, resulting in the generation of electricity and the refrigeration of materials to be cooled.

In the system of FIG. 2, incoming gas A from low pressure gas distribution line 192 enters low pressure compression section 102 via line 194, provided with valve 195, exits through outlet line 104, passes through low pressure cooler 106, and enters intermediate pressure compression section 110 through inlet line 108. Intermediate pressure compression section 110 is cooled by intermediate pressure compression section cooler 188 with coolant circulating between intermediate pressure compression section 110 and cooler 188 through cooling loop 190.

Compressed gas from intermediate pressure compression section 110 passes through outlet line 112, into cooler 114, and inlet line 116 before entering high pressure compression section 118. After undergoing further compression, the gas passes through outlet line 120, aftercooler 122, feed line 124, valve 126, feed/discharge line 128, and valve 130 before entering high pressure transmission line 132.

During this compression cycle, valves 126, 130, and 195 remain open, while valves 136 and 193 are closed. After compression is completed, valve 195 is closed to isolate distribution line 192, and valve 130 is closed to retain the gas in transmission line 132. When electrical power demands warrant removal of compressed gas from transmission line 132, valves 130, 136, and 193 are opened, while valves 126 and 195 are kept closed, to permit the compressed gas to enter the expansion train.

The compressed gas released from transmission line 132 passes through valve 130, feed/discharge line 128, discharge line 134, valve 136, recuperator 138, air trip valve 140, air throttle valve 142, and line 146 before entering high pressure expansion stage 148. Upon completion of this expansion stage, the compressed gas passes through line 150 into low pressure expansion stage 156. From low pressure expansion stage 156, gas exits out through outlet line 158. Again, the expansion train is operated so that the gas previously stored in chamber 132 is chilled upon entering outlet line 158. That gas can then be passed into refrigeration unit 160, where it is contacted with a material requiring refrigeration. Such refrigeration is achieved by passing the gas through refrigeration coil 162 of refrigeration unit 160. Within refrigeration unit 160, the gas is used to cool warm material H entering line 164 so that cool material C is discharged. From refrigeration unit 160, gas passes via valve 193 into distribution line 192.

As in FIG. 1, the expansion and compression trains of FIG. 2 are both coupled to motor/generator 166.

With respect to the compression train, motor/generator 166 is coupled to low pressure compression section 102 by means of shaft 168, clutch 174, and shaft 176. Low pressure compression section 102 is connected to speed increasing gear 182 via shaft 180. Speed increasing gear 182 is coupled to intermediate pressure compression section 110 and high pressure compression section 118 by shaft 184 on which both of these compressor stages are mounted. Note that shafts 176 and 180 are flexibly coupled.

Turning to the expansion train, motor/generator 166 is coupled to low pressure expansion section 156 by shaft 170, clutch 172, and shaft 178. Shaft 178 is additionally coupled to high pressure expansion section 148. The compression and expansion trains of FIG. 2 operate in substantially the same fashion as those of FIG. 1.

The compression train of FIG. 2 is cooled, and the compressed gas released from transmission line 132 is heated, using recuperator 138, in substantially the same fashion already described above with respect to the system of FIG. 1. In brief, cooling fluid passing through coolant line 186 circulates between recuperator 138, low pressure compression section cooler 106, intermediate pressure compression section cooler 188, intercooler 114, and aftercooler 122.

The key distinction between the systems of FIGS. 1 and 2 is that FIG. 2 does not include high pressure and low pressure combustors directly fired with process gas from transmission line 132. As a result, because the compressed gas is not provided with these supplemental sources of heat, operation of the expansion train is less powerful for a given size expansion train than in that of FIG. 1. However, elimination of these combustion stages permits the system to be utilized with gases besides air, particularly more valuable industrial product gases, whose purity should not be altered. This is because there is no combustion stage to contaminate those gases with either fuel or combustion by-products. If desirable, supplemental indirect heating can be effected by conveying gas from transmission line 132 through a heat exchanger (e.g., recuperator 138) or a furnace. Besides air, the system of FIG. 2 can utilize a wide variety of industrial gases, including natural gas, or other combustible gases. Natural gas is particularly preferred.

In operation, the system of FIG. 2 would utilize the operating conditions set forth in Table 2.

TABLE 2

| Inlet to Low Pressure Compression Section 102 | |
| --- | --- |
| Pressure | 1 Bar |
| Temperature | 20° C. |
| Exhaust from High Pressure Compression Section 118 | |
| Pressure | 50 Bar |
| Temperature | To 300° C. |
| Air in Transmission Line 132 | |
| Pressure | 50 Bar |
| Temperature | 20° C. |
| Flow Rate | To 1,000 lb/sec |
| Inlet to High Pressure Expander 148 | |
| Pressure | To 70 Bar |
| Temperature | 20 to 300° C. |
| Inlet to Low Pressure Expander 156 | |
| Pressure | 20 Bar |
| Temperature | 300° C. |
| Exhaust from Low Pressure Expander 156 | |
| Pressure | 2 Bar |
| Temperature | 0 to 150° C. |
| Power Generation by Motor/Generator 166 | To 100 MW |

Although the invention has been described in detail for the purpose of illustration, it is understood that such detail is solely for that purpose, and variations can be made therein by those skilled in the art without departing from the spirit and scope of the invention which is defined by the following claims.

What is claimed:

1. A process of cogeneration utilizing a compressed gas energy storage system comprising a gas storage area, a compression train for pressurizing a gas to be stored in the gas storage area, and an expansion train for depressurizing high pressure gas released from the gas storage area, said process comprising:

operating the compression train during off-peak electricity utilization periods to produce a compressed gas;

storing the compressed gas in the gas storage area;

releasing the compressed gas from the gas storage area during peak electricity utilization periods;

passing the compressed gas released from the gas storage area through the expansion train to generate electricity and to reduce the compressed gas pressure and temperature; and refrigerating a material with the compressed gas by contacting the material with the gas.

2. A process according to claim 1 further comprising:

subjecting the compressed gas to combustion during said passing.

3. A process according to claim 2, wherein the compressed gas is air.

4. A process according to claim 1, wherein said passing is carried out without subjecting the compressed gas to combustion.

5. A process according to claim 1, wherein the compressed gas is a combustible gas.

6. A process according to claim 5, wherein the combustible gas is natural gas.

7. A process according to claim 1, wherein the compression train has multiple sections.

8. A process according to claim 7, wherein the compression train has three sections.

9. A process according to claim 8, wherein one or more of the three sections of the compression train are mounted on a common shaft.

10. A process according to claim 7, wherein the compression train has a cooler after each section.

11. A process according to claim 1, wherein the expansion train has multiple sections.

12. A process according to claim 11, wherein the expansion train has two sections.

13. A process according to claim 12, wherein the expansion train has a combustor before each section.

14. A process according to claim 12, wherein the two sections of the expansion train are coupled to a generator mounted on a common shaft.

15. A process according to claim 1, wherein, during said passing, the compressed gas is depressurized from 100 bars to atmospheric pressure.

16. A process according to claim 1 further comprising:

cooling the gas during said operating the compression train with a cooling fluid;

heating the compressed gas during said releasing by passing the compressed gas through a heat exchanger; and contacting the cooling fluid with the heat exchanger to transfer heat from the cooling fluid to the heat exchanger, to reduce the temperature of the cooling fluid, and to warm the heat exchanger for said heating.

17. A process according to claim 1, wherein the gas storage area is a cavern.

18. A process according to claim 1, wherein the gas storage area is a gas transmission line.

19. A process of electricity generation utilizing a compressed gas energy storage system comprising a gas storage area, a compression train for pressurizing a gas to be stored in the gas storage area, and an expansion train for depressurizing high pressure gas released from the gas storage area, said process comprising:

operating the compression train during off-peak electricity utilization periods to produce a compressed gas;

cooling the gas during said operating the compression train with a cooling fluid;

storing the compressed gas in the gas storage area;

releasing the compressed gas from the gas storage area during peak electricity utilization periods;

passing the compressed gas released from the gas storage area through the expansion train to generate electricity;

heating the compressed gas during said releasing by passing the compressed gas through a heat exchanger; and contacting the cooling fluid with the heat exchanger to transfer heat from the cooling fluid to the heat exchanger, to cool the cooling fluid, and to warm the heat exchanger for said heating.

20. A process according to claim 19, wherein the compression train has multiple sections.

21. A process according to claim 20, wherein the compression train has a cooler after each section.

22. A process according to claim 19, wherein the expansion train has multiple sections.

23. A process according to claim 22, wherein the expansion train has a combustor before each section.

24. A compressed gas energy storage system comprising:

a gas storage area for storing compressed gas;

a compression train for pressurizing a gas to be stored in said gas storage area;

one or more heat exchangers for cooling the gas as it is pressurized in said compression train, wherein the cooling is achieved by indirect contact with a cooling fluid;

an expansion train for depressurizing compressed gas released from said gas storage area; and a heat exchanger for recoverying heat from the cooling fluid, for cooling the cooling fluid, and for warming the compressed gas released from said gas storage area.

25. A system according to claim 24, wherein said compression train has multiple sections.

26. A system according to claim 25, wherein said compression train has a cooler after each section.

27. A system according to claim 24, wherein said expansion train has multiple sections.

28. A system according to claim 27, wherein said expansion train has a combustor before each section.

* * * * *